United States Patent [19]

Byrnes

[11] Patent Number: 4,679,812
[45] Date of Patent: Jul. 14, 1987

[54] APPARATUS FOR SIMPLIFYING THE LAUNCHING AND RETRIEVAL OF A BOAT FROM ITS TRAILER

[76] Inventor: Donn A. Byrnes, 94 High Mesa Rd., Los Lunas, N. Mex. 87031

[21] Appl. No.: 810,997

[22] Filed: Dec. 19, 1985

[51] Int. Cl.⁴ ............................................... B60D 1/06
[52] U.S. Cl. ................................. 280/406 A; 414/478
[58] Field of Search ................. 414/477, 478, 500; 280/406 A, 406 R

[56] References Cited

U.S. PATENT DOCUMENTS

| | | | |
|---|---|---|---|
| 2,713,501 | 7/1955 | Peak | 280/482 X |
| 3,411,644 | 11/1968 | Cook | 414/500 X |
| 3,645,560 | 2/1972 | Steele | 280/482 |
| 3,843,163 | 10/1974 | Hale | 280/482 X |
| 4,248,451 | 2/1981 | Usinger | 280/406 A |
| 4,286,906 | 9/1981 | Robertson | 414/477 |

OTHER PUBLICATIONS

Sears catalog, Item 10, "Port Adapter Plate".

Primary Examiner—Robert J. Spar
Assistant Examiner—Stuart J. Millman
Attorney, Agent, or Firm—Daniel V. Thompson

[57] ABSTRACT

An apparatus for simplifying the launching and retrieval of a boat from its trailer is provided. The apparatus includes a longitudinal body, an electrical or manual winch, a coupler for mounting to the trailer hitch ball on the towing vehicle, a trailer hitch ball for coupling the boat trailer to the apparatus and a locking assembly to secure the apparatus to the boat trailer structure.

5 Claims, 6 Drawing Figures

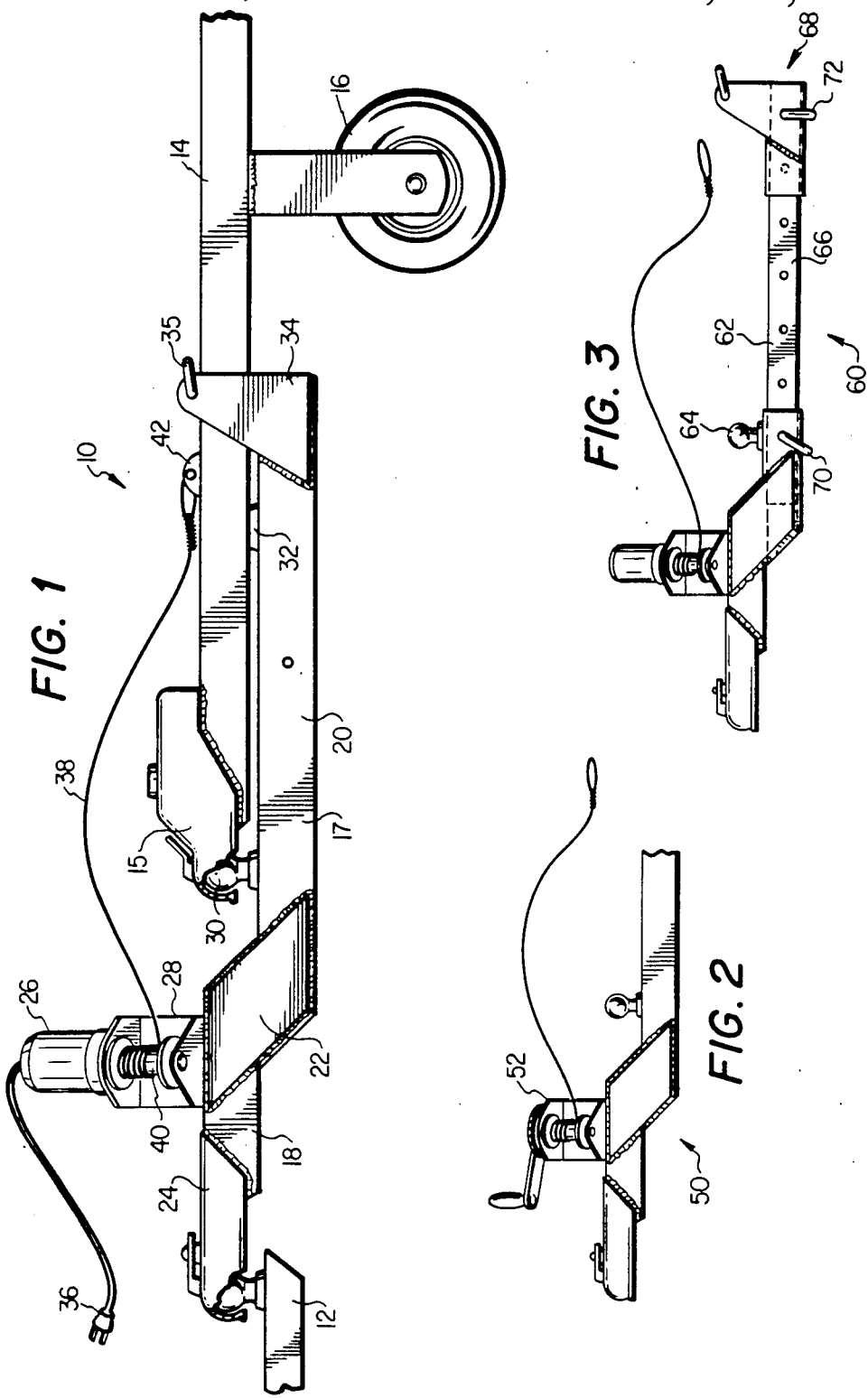

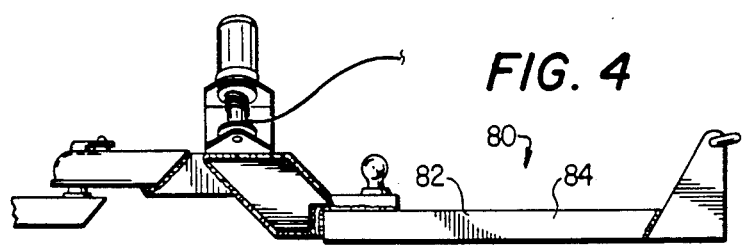
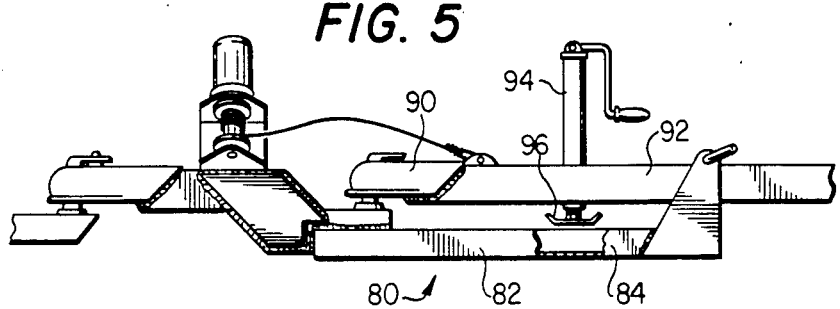
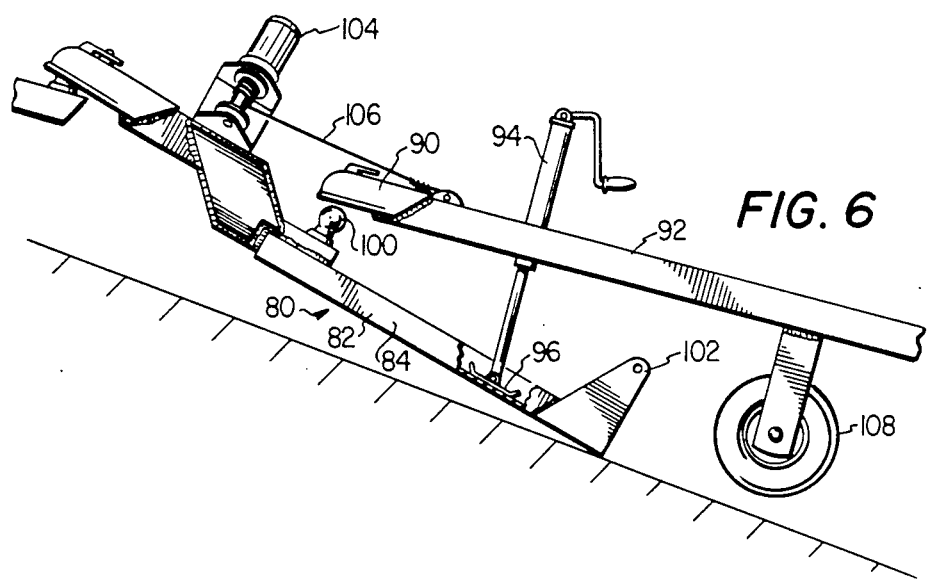

APPARATUS FOR SIMPLIFYING THE LAUNCHING AND RETRIEVAL OF A BOAT FROM ITS TRAILER

FIELD OF INVENTION

This invention relates to boats and boat trailers and more particularly relates to an apparatus for simplifying and making more safe the launching and retrieval of moderate and deep draft trailerable boats.

BACKGROUND ART

Moderate and deep draft boats on trailers are often launched from inclined ramps at the water's edge. The trailer and boat are backed down the ramp into the water until the water is deep enough to float or slide the boat off the trailer. A tow vehicle can only go so far into the water before incurring damage, and it has been found that the inclination of the typical launch ramp is insufficient to allow the launch of a moderate or deep draft boat without decoupling the trailer from the tow vehicle. Once the boat is launched from the decoupled trailer, some means for retrieving the trailer must be provided. Similar problems arise when retrieving moderate or deep draft boats at typical launch ramps.

The currently existing boat trailer hardware art includes extending trailer tongues, pieces of free cable attached to the trailer and other "extender" type hardware to permit the trailer to be uncoupled and lowered far enough down the launch ramp into the water for the boat to float from the trailer. Extension tongues and extender cables suffer from numerous drawbacks, including the considerable manipulation required to extend and retract the additional hardware. There is extra time taken on the launching ramp while others wait. The use of a free cable requires extra time and also creates the increased potential for trailer loss due to poor cable connections between the tow vehicle and the boat trailer. This heightens the potential for a loose trailer on the ramp resulting in damage to other boats, as well as personal injury.

A need has thus arisen for a launching and retrieval aid for enabling easier, more rapid and more secure boat launches and recoveries and for consuming less time for manipulation while occupying the launch ramp.

SUMMARY OF THE INVENTION

The present invention provides an apparatus for launching trailerable boats which eliminate or substantially reduce the problems heretofore associated with prior apparatus.

In accordance with the present invention a launching and retrieval apparatus is provided which includes a longitudinal body, a coupler for attachment to the tow vehicle, a hitch ball to which the boat trailer coupler is attached, a guide mechanism allowing only axial (fore and aft) motion of the boat trailer coupler to activate the surge brakes on the boat trailer and a winch with sufficient power and cable length to lower the uncoupled boat trailer down the ramp under complete control until the boat floats free or is easily removed from the trailer. The winch also provides the capability to retrieve both trailer and boat during boat recovery.

In accordance with a more specific aspect of the present invention, a launching and retrieving apparatus is provided which includes a longitudinal body on which are mounted a coupler for attaching to a hitch ball on the towing vehicle and a hitch ball to which the boat trailer coupler is attached. At the aft end of the longitudinal body there is provided a guide mechanism which permits only fore and aft (axial) sliding motion of the boat trailer main body with respect to the hitch ball (previously mentioned) that is mounted to the longitudinal body of the launching and retrieval apparatus. The guide mechanism permits only axial relative motion and severely restricts or eliminates altogether any horizontal, side-to-side relative motion (lateral motion) between the longitudinal body of the apparatus and the boat trailer structure and any relative motion between the longitudinal body and the boat trailer body in the vertical direction. More specifically, when the longitudinal body is properly affixed by the rear coupling mechanism and the hitch ball to the boat trailer structure, it essentially becomes an extension of and an integral part of the boat trailer itself; the only exception being the fore and aft motion of the apparatus in the direction of towing to permit activation of the boat trailer surge brakes. This invention also provides for boat and trailer combinations with heavy tongue weights, the ability to use the mechanical advantage of a standard tongue hand cranked jack to facilitate the separation of the apparatus from the boat trailer during preparation for launch or other times when required. This same hand cranked tongue jack, mounted on the boat trailer itself is, used as an aid in recoupling the boat trailer coupler to the hitch ball mounted on the longitudinal body of the apparatus.

The operation of the apparatus, once decoupled from the boat trailer but still coupled to the tow vehicle is as follows. The winch, either electric (connected to the tow vehicle's electrical system through appropriate wires and plugs) or a manual model, is operated in a manner to pay out the cable. As the cable is let out, the weight of the boat and trailer combination causes the boat and trailer to proceed down the ramp toward deeper water. The cable is let out by the winch until such time as the boat/trailer combination has reached a water depth such that the boat can float free of or be easily separated from the trailer. Once the boat is free of the trailer the winch is operated to wind in the cable, thereby retrieving the trailer. The retrieval process continues until the trailer can be recoupled to the hitch ball mounted on the apparatus and the aft coupling mechanism locked to once again secure the boat trailer to the launching apparatus. At this point, the tow vehicle and trailer, coupled together by the launching apparatus, may be driven from the launching ramp.

BRIEF DESCRIPTION OF THE DRAWINGS

For a more complete understanding of the present invention and for further objects and advantages thereof, reference is now made to the following Detailed Description taken in conjunction with the accompanying Drawings in which:

FIG. 1 is a partially broken away side view illustrating a preferred embodiment of the present boat trailer launching and retrieving apparatus.

FIG. 2 is a partial side view of a second embodiment of this invention wherein the electrical winch is replaced by a manual, hand cranked winch.

FIG. 3 is a side view of a third embodiment of this invention wherein the rear section of the longitudinal body behind hitch ball includes a smaller cross section tubing, thus permitting the slack adjusting bumper, vertical plate and locking pin assembly to be adjustable fore and aft for various lengths and physical arrangements of different models of boat trailer tongues and surge brake assemblies.

FIGS. 4 and 5 illustrate a fourth embodiment of this invention wherein the after portion of the longitudinal body has been replaced with a piece of "U" channel to facilitate the separation and recoupling of the launching apparatus to the boat trailer when there are heavy tongue weights involved.

FIG. 6 provides a view of the embodiment of FIGS. 4 and 5 in operation.

DETAILED DESCRIPTION

Referring initially to FIG. 1, the present apparatus is generally identified by the numeral 10. Apparatus 10 is coupled to a tow vehicle hitch 12 and a boat trailer tongue 14 with coupler 15 and wheel 16. Hitch 12, tongue 14, coupler 15, and wheel 16 are conventional and not intended to be a part of the present invention.

Apparatus 10 includes a longitudinal body 17 formed from front member 18 and rear member 20 which are welded together and reinforced with stiffener plates 22 on either side. A trailer ball coupler 24 is attached to the forward end of member 18 and a winch 26 is mounted using a mounting plate 28 made of steel channel. Winch 26 is mounted in an inclined position as shown to eliminate interference between the winch and the rear of the tow vehicle during short radius turns and backing maneuvers. This manner of mounting also permits access to the drum end of the winch which contains provisions for insertion of a hand crank for emergency manual operation of the winch. The rear member 20 of the longitudinal body 17 has mounted upon it a hitch ball 30 to accommodate coupler 15. Rear member 20 also includes a slack adjusting bumper 32, two vertical plates 34 for holding the boat trailer tongue 14 securely and a locking pin 35 which secures the boat trailer tongue 14. Relative motion between the apparatus 10 and the boat trailer tongue 14 is thus permitted in only in fore and aft directions (axial motion). This permits the boat trailer surge brakes to function properly, just as if the trailer coupler 15 were attached directly to the tow vehicle hitch 12. It will be appreciated that this launching and retrieving apparatus operates equally well on trailers having no surge brakes or on trailers having electric brakes, and the application of this apparatus is thus not limited only to trailers with surge brakes. Winch 26 receives its power from the tow vehicle electrical system through a connector 36 at the rear of the tow vehicle. Winch cable 38 is securely attached to both the winch drum 40 and the boat trailer tongue 14 at the pinned bracket 42.

In operation, the tow vehicle and boat trailer with apparatus 10 attached are backed down the boat launch ramp to a position for launch. Once the rear tires of the tow vehicle approach the water's edge (the boat and trailer have already entered the water) the tow vehicle brakes are set and the rear wheels properly chocked. The person or persons to accomplish the launch move to the rear of the tow vehicle and first unlock the boat trailer coupler 15 from hitch ball 30. Next the lock pin 35 is removed allowing apparatus 10 to pivot downwardly until the tongue wheel 16 contacts the ramp. At this point the apparatus may be further pivoted downward freeing the boat trailer coupler 15 from the hitch ball 30. Now the boat trailer is attached to the apparatus 10 (which remains firmly secured to the tow vehicle hitch 12 by the coupler 24) only through its attachment to the winch cable 38 at the attached pinned bracket 42.

To complete the launch, the person activates the winch 26 in a manner to pay out the cable 38. This operation allows the boat and trailer to roll farther down the launch ramp toward deeper water until the boat floats free of the trailer or is easily slipped from the trailer.

To retrieve the boat trailer (now free of the boat) the winch 26 is powered in the reverse direction winding in the cable 38 and thus pulling the boat trailer back to the apparatus which has remained fastened to the tow vehicle during the entire operation. When the cable 38 has been drawn in to the point where the boat trailer coupler 15 lines up with ball 30, the winch is stopped and the boat trailer is recoupled. Then the rear member 20 of the apparatus 10 is raised until the locking pin 35 can be inserted through the holes in the two vertical plates 34 above the trailer tongue 14. These two connections securely lock the launching apparatus to the boat trailer, the apparatus already being firmly attached to the tow vehicle. The tow vehicle, apparatus and boat trailer can then be driven from the launch ramp and parked to await the retrieval of the boat at a later time. The recovery sequence for putting the trailer in the water, floating or sliding or rolling the boat on to the trailer and then retrieving the boat trailer and boat combination is the same as described above except that the boat trailer goes into the water empty and is retrieved with the boat on it instead of vice versa as described above.

Referring now to FIG. 2, a second embodiment 50 of this invention is shown, wherein the electrical winch is replaced by a manual, hand operated winch 52. All operations remain the same except manual winching is used instead of electrical winch operation.

FIG. 3 shows a third embodiment 60 of this invention wherein, the rear portion of the longitudinal body 62 aft of the hitch ball 64 is modified. The solid member of FIG. 1 has been replaced by a smaller cross section adjustable member 66 with holes drilled at intervals to permit shortening or extending the distance between hitch ball 64 and the rear locking mechanism generally identified by the numeral 68. Adjustable member 66 can be locked to the forward section of the apparatus 60 using a locking pin 70. The rear locking mechanism 68 is locked to the rear section of the adjustable member 66 by locking pin 72. The apparatus may be shortened by feeding the adjustable member 66 forward and locking with pin 70 or sliding the rear locking mechanism 68 forward and locking with pin 72. This type of adjustment accomodates many configurations of boat trailer couplers/tongues.

FIG. 4 shows a fourth embodiment 80 of this invention wherein the rear portion of the longitudinal body 82 includes "U" channel 84. All other functions and pieces remain the same except for the use of this channel.

FIG. 5 shows the embodiment of FIG. 4 attached to a boat trailer coupler 90 and trailer tongue 92. The tongue 92 has mounted centrally a hand cranked tongue jack 94. Mounted to the bottom portion of the jack 94 is a pivoted sliding foot 96.

In operation, as shown in FIG. 6, the embodiment shown in FIGS. 4 and 5 is used to assist in the decoupling and coupling of the apparatus 80 and the boat trailer when heavy tongue weights are involved. In the launch process, the boat trailer coupler 90 is unlocked but rests on hitch ball 100. Then the channel 84 is supported at the rear near the vertical plates 102 to permit the lock pin to be removed. Then the after end of apparatus 80 is lowered to the ground. The tongue jack 94 is extended until the pivoted sliding foot 96 is in contact with the "U" channel 84. Continued extension of jack 94 causes the trailer ball coupler 90 to separate vertically from the hitch ball 100 as shown. The next step is to activate the winch 104 and pay out cable 106 so that the trailer rolls rearward until the coupler 90 is well to the rear of hitch ball 100. At this point the tongue jack 94 is retracted raising the pivoted sliding foot 96 such that tongue wheel 108 contacts the boat ramp. Once the tongue jack 94 is well retracted the winch 104 is operated to let out cable 106 and the remainder of the launch is as previously described. The retrieval is a reverse of the steps above until coupler 90 is again locked on hitch ball 100. Then the aft end of the apparatus is raised to permit insertion of a locking pin through the holes in plates 102 and over the trailer tongue 92. The tongue jack 94 is then extended until the pivoted sliding foot 96 rides on the interior surface of the "U" channel 84 to restrict relative vertical motion between the apparatus 80 and the boat trailer tongue 92.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A boat launching and retrieving apparatus comprising:
   a longitudinal body adapted to serve as an intermediate coupling apparatus between a tow vehicle and a boat trailer; a winch mounted to said longitudinal body for lowering the boat trailer down a boat ramp for launching and pulling the boat trailer up the boat ramp for retrieval;
   means for limiting relative motion of said apparatus and the boat trailer to fore and aft axial motion; said longitudinal body including a front member, a rear member attached below and extending rearwardly from said front member, first coupling means associated with said front member, said coupling means associated with said rear member; and said first coupling means, second coupling means and means for limiting relative motion being substantially colinear.

2. The apparatus of claim 1 wherein:
   said means for limiting relative motion includes upstanding, spaced apart plate members for receiving the tongue of a boat trailer, and means for releasably restricting upward motion of the tongue between said plate members; and
   said means for restricting upward motion includes aligned holes in the upper portions of the plate members and a removable locking pin sized for insertion through the holes.

3. An apparatus simplifying the launching and retrieval of a boat from its trailer comprising:
   a longitudinal body;
   a coupler attached to the front of the longitudinal body for attachment to a hitch ball on a towing vehicle;
   a hitch ball attached to the mediate portion of the longitudinal body for coupling to the boat trailer;
   first and second spaced apart upstanding plates attached to the rear portion of the longitudinal body adapted for receiving the tongue of the boat trailer therebetween and having aligned holes in the upper portions thereof for receiving a locking pin;
   said coupler, said hitch ball, and said holes in said plates being disposed such that said longitudinal body and the boat trailer tongue are substantially parallel when the boat trailer is attached to the apparatus; and
   a winch attached to said longitudinal body between said coupler and said hitch ball.

4. The apparatus of claim 3 wherein said winch is mounted to said longitudinal body on an inclined mount.

5. The apparatus of claim 3 wherein said longitudinal body includes a rear adjustable member formed of tubing having a square cross section and holes therethrough at intervals, the adjustable member being adapted for lockable sliding attachment to the front portion of said longitudinal body and to said upstanding plates by means of locking pins.

* * * * *

UNITED STATES PATENT AND TRADEMARK OFFICE
CERTIFICATE OF CORRECTION

PATENT NO.  :  4,679,812

DATED       :  July 14, 1987

INVENTOR(S) :  Donn A. Byrnes

It is certified that error appears in the above-identified patent and that said Letters Patent is hereby corrected as shown below:

Claim 1, Column 5, line 44, change "said" before "coupling" to -- second --.

Signed and Sealed this

Thirteenth Day of October, 1987

Attest:

DONALD J. QUIGG

*Attesting Officer*

*Commissioner of Patents and Trademarks*